(12) United States Patent
Landauer et al.

(10) Patent No.: US 10,929,739 B2
(45) Date of Patent: Feb. 23, 2021

(54) SYSTEM AND METHOD FOR DETECTING TAMPERING WITH A PRODUCT (71) Applicant: NXP B.V., Eindhoven (NL)

(72) Inventors: Gerhard Martin Landauer, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/552,578

(22) Filed: Aug. 27, 2019

(65) Prior Publication Data
US 2020/0082238 A1 Mar. 12, 2020

(30) Foreign Application Priority Data

Sep. 6, 2018 (EP) ..................................... 18192899

(51) Int. Cl.
*G06K 19/00* (2006.01)
*G06K 19/073* (2006.01)
*G06K 19/077* (2006.01)
*G06K 19/07* (2006.01)

(52) U.S. Cl.
CPC ... *G06K 19/07372* (2013.01); *G06K 19/0723* (2013.01); *G06K 19/07749* (2013.01)

(58) Field of Classification Search
CPC ......... G06K 19/07372; G06K 19/0723; G06K 19/07749
USPC ................................. 235/487, 492, 380, 382
See application file for complete search history.

(56) References Cited

U.S. PATENT DOCUMENTS

| 4,885,571 A | 12/1989 | Pauley et al. |
| 5,298,884 A | 3/1994 | Gilmore et al. |
| 7,152,804 B1 * | 12/2006 | MacKenzie ...... G06K 19/07749 235/492 |
| 2005/0051624 A1 | 3/2005 | Kipp et al. |
| 2008/0143519 A1 | 6/2008 | Piotrowski |

(Continued)

FOREIGN PATENT DOCUMENTS

| CN | 106557805 A | 4/2017 |
| EP | 1063627 A2 | 12/2000 |

(Continued)

OTHER PUBLICATIONS

Murafore, Dante Gabriel et al; "A Capacitive Sensor Interface for High-Resolution Acquisitions in Hostile Environments"; IEEE Latin American Symposium on Circuits and Systems, Conference Paper; 4 pages (2016).

(Continued)

*Primary Examiner* — Karl D Frech
(74) *Attorney, Agent, or Firm* — Charlene R. Jacobsen (57) ABSTRACT

A system for detecting tampering with a product includes a capacitor in or attached to the product, an integrated circuit configured to inject a current the capacitor and to detect a corresponding voltage slope on the capacitor. The integrated circuit is further configured to divide the voltage slope into a plurality of slope segments, discard a first set of slope segments, whose slope value falls outside a predefined range of slope values, and use a second set of slope segments, whose slope value falls within said predefined range, for determining a capacitance on the capacitor. A corresponding method for detecting tampering with a product is conceived, and a corresponding computer program is provided.

13 Claims, 5 Drawing Sheets

(56) References Cited

U.S. PATENT DOCUMENTS

2016/0189022 A1 6/2016 Raven et al.
2017/0116506 A1 4/2017 Raven

FOREIGN PATENT DOCUMENTS

EP 1063627 A3 12/2000
WO WO-2006/046157 A1 5/2006

OTHER PUBLICATIONS

Brasseur, Georg; "Design Rules for RobustCapacitive Sensors"; IEEE Transactions Instrumentation and Measurement, vol. 52, No. 4; 5 pages (Aug. 2003).
"RF Micron Magnus 5 Product Family—RF Micron"; retreived from the internet http://rfmicron.com/magnus-family; 2 pages retreived from the Internet Aug. 22, 2019.
"Texas Instruments FDC2214—Four channel, 28 bit Noise-Immune Capacitive Sensing Solution for Proximity Sensing"; retreived from the Internet www.fi.com/product/FDC2214; 5 pages retreived on Aug. 22, 2019.

\* cited by examiner

SYSTEM AND METHOD FOR DETECTING TAMPERING WITH A PRODUCT

CROSS-REFERENCE TO RELATED APPLICATIONS

This application claims the priority under 35 U.S.C. § 119 of European patent application no. 18192899.5, filed Sep. 6, 2018 the contents of which are incorporated by reference herein.

FIELD

The present disclosure relates to a system for detecting tampering with a product. Furthermore, the present disclosure relates to a method for detecting tampering with a product, and to a corresponding computer program.

BACKGROUND

Tamper detection devices often comprise an integrated circuit (i.e., a chip) which is coupled to a capacitor. The integrated circuit may for example be included in a radio frequency identification (RFID) tag or a near field communication (NFC) tag. In operation, changes in the capacitance on the capacitor may be indicative of a tampering attempt on the product, and information indicating the same can be stored in the integrated circuit. Subsequently, this information can be read out by an RFID reader or an NFC reader.

For example, the capacitor can be a plate capacitor consisting of two metal foils and a plastic foil in the middle as the dielectric. Such a capacitor can be fixed to a bottle closure to protect an expensive bottle of wine against tampering, and once the bottle is opened the capacitor is destroyed or at least the capacitance value is altered significantly. Information indicating the same can be stored in the tag's integrated circuit (IC). Then the RFID tag fixed to the capacitor can be read out with a mobile phone, and it may be displayed on the phone that someone has manipulated the bottle. In another example, the tamper detection device may be applied to envelopes, the paper being the dielectric. Then, it can be detected if the envelope was altered or manipulated.

It is important that the detection of tamper attempts is as accurate as possible. The presently disclosed system and method facilitate increasing the accuracy of tamper attempt detections.

SUMMARY

In accordance with a first aspect of the present disclosure, a system for detecting tampering with a product is provided, the system comprising: a capacitor comprised in or attached to the product; an integrated circuit configured to inject a current in said capacitor and to detect a corresponding voltage slope on said capacitor; wherein the integrated circuit is further configured to divide said voltage slope into a plurality of slope segments; wherein the integrated circuit is further configured to discard a first set of slope segments, whose slope value falls outside a predefined range of slope values; wherein the integrated circuit is further configured to use a second set of slope segments, whose slope value falls within said predefined range, for determining a capacitance on the capacitor.

In an embodiment, the integrated circuit is further configured to use only those slope segments of the second set that have substantially the same slope value for determining the capacitance on the capacitor.

In an embodiment, the integrated circuit comprises an array of comparators for detecting the voltage slope on said capacitor.

In an embodiment, the integrated circuit comprises a comparator with a switchable reference voltage source for detecting the voltage slope on said capacitor.

In an embodiment, the integrated circuit is further configured to compare the capacitance with a reference value to detect said tampering with the product.

In an embodiment, the integrated circuit comprises a configurable capacitor array switchably coupled to the capacitor, for reducing the input impedance of the capacitor.

In an embodiment, the integrated circuit is configured to connect the configurable capacitor array to the capacitor if the capacitance on said capacitor falls below a predefined threshold.

In an embodiment, the integrated circuit is configured to disconnect the configurable capacitor array from the capacitor if the capacitance on said capacitor exceeds the predefined threshold.

In an embodiment, the integrated circuit is comprised in a radio frequency identification, RFID, tag or in a near field communication, NFC, tag.

In accordance with a second aspect of the present disclosure, a method for detecting tampering with a product is conceived, the method comprising: an integrated circuit injects a current in a capacitor comprised in or attached to the product; the integrated circuit detects a corresponding voltage slope on said capacitor; the integrated circuit divides said voltage slope into a plurality of slope segments; the integrated circuit discards a first set of slope segments, whose slope value falls outside a predefined range of slope values; the integrated circuit uses a second set of slope segments, whose slope value falls within said predefined range, for determining a capacitance on the capacitor.

In an embodiment, the integrated circuit uses only those slope segments of the second set that have substantially the same slope value for determining the capacitance on the capacitor.

In an embodiment, the integrated circuit comprises a configurable capacitor array switchably coupled to the capacitor, for reducing the input impedance of the capacitor.

In an embodiment, the integrated circuit connects the configurable capacitor array to the capacitor if the capacitance on said capacitor falls below a predefined threshold.

In accordance with a third aspect of the present disclosure, a computer program is provided, comprising instructions that, when executed, carry out or control a method of the kind set forth.

In an embodiment, a non-transitory computer-readable medium comprises a computer program of the kind set forth.

DESCRIPTION OF DRAWINGS

Embodiments will be described in more detail with reference to the appended drawings, in which.

DESCRIPTION OF EMBODIMENTS

Figure 1:
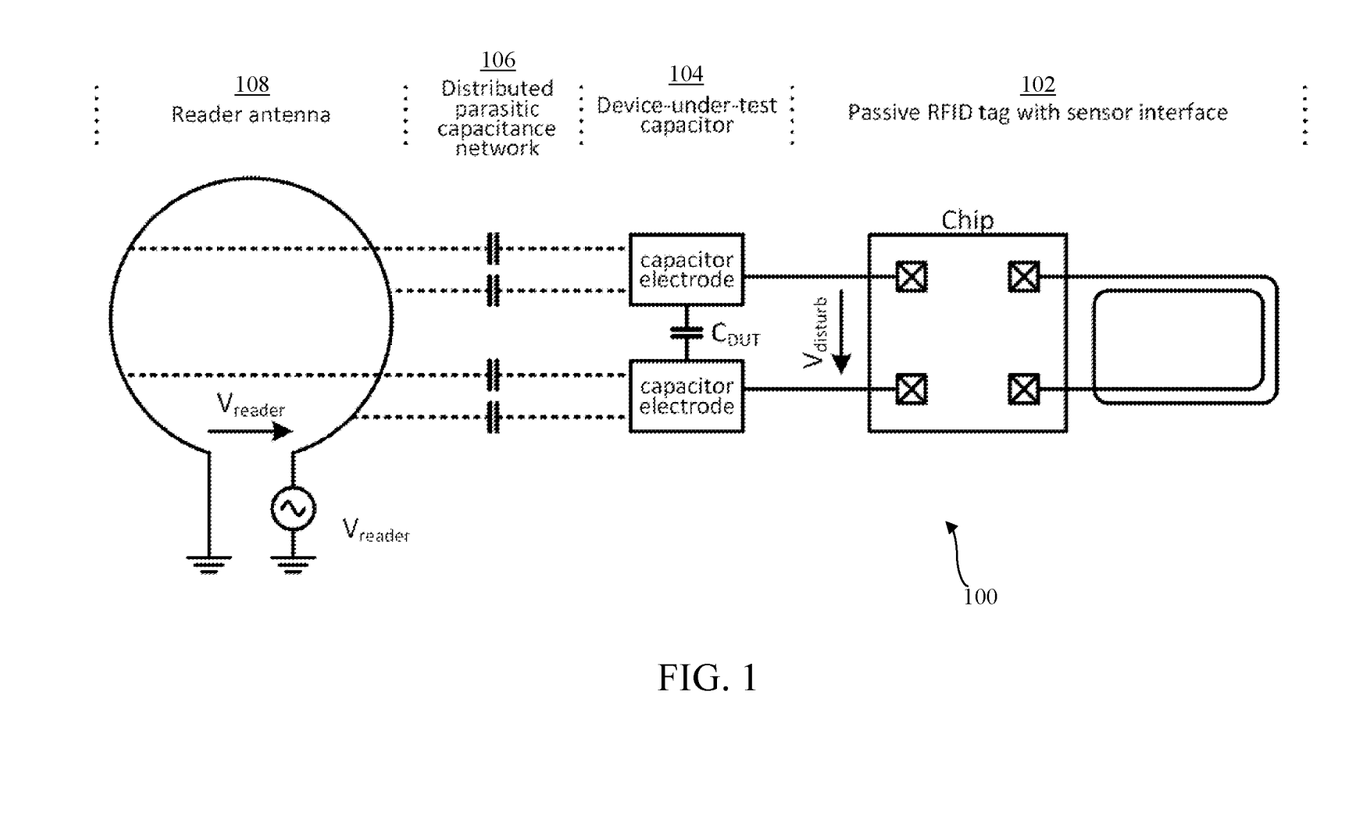
FIG. 1 shows an example of a tamper detection system.

FIG. 1 shows an example of a tamper detection system 100. The system 100 comprises the following elements: a passive RFID tag with a sensor interface 102, a device-under-test capacitor 104, a distributed parasitic capacitance network 106, and a reader antenna 108. As mentioned above, tamper detection devices often comprise an integrated circuit (i.e., a chip) which is coupled to a capacitor. The integrated circuit may for example be included in a radio frequency identification (RFID) tag or a near field communication (NFC) tag. In operation, changes in the capacitance on the capacitor may be indicative of a tampering attempt on the product, and information indicating the same can be stored in the integrated circuit. Subsequently, this information can be read out by an RFID reader or an NFC reader. Changes in the capacitance can be detected by measuring the voltage slope on the capacitor. When the capacitance value is altered due to tampering, the voltage slope changes because the injected current during measurement remains substantially the same: $\Delta V/\Delta t = I/C$.

The passive RFID tag 102 shown in FIG. 1 contains an integrated circuit (i.e., a chip) of the kind set forth. Furthermore, the device-under-test capacitor 104 is an example of a capacitor of the kind set forth. The reader antenna 108 forms part of an RFID reader, which is configured to read out data from the RFID tag through said antenna 108. The RFID tag also comprises an RFID antenna. It is noted that the coupling between the capacitor and the chip is referred to as a sensor interface in the present example.

It is important that the detection of tamper attempts is as accurate as possible. Since the detection of a tamper attempt depends on the value of the capacitance on the capacitor, it is important that this capacitance value is not disturbed by external influences. In particular, the capacitance value may be influenced by other factors than tamper attempts, for example by electromagnetic disturbances caused by the field generated by the RFID reader. More specifically, capacitive sensors based on passive RFID tags may be difficult to realize, because such sensors do not only require ultra-low power consumption, but they should also be robust against electromagnetic disturbances. Passive RFID sensor tags are powered by energy harvested from the reader field, so during operation the plates of the capacitor to be measured and therefore the sensor interface is constantly exposed to electromagnetic disturbances. The presently disclosed system and method facilitate achieving robust and accurate capacitance measurements under such conditions, while at the same time meeting the power requirements of passive RFID systems.

While for the coupling system between an RFID reader antenna and an RFID tag antenna the focus is often on inductive coupling, in the case of capacitive sensors it is the capacitive coupling which causes disturbance issues. More specifically, there exists a distributed network of parasitic capacitances 106 between the reader antenna and the electrodes of the device-under-test capacitor $C_{DUT}$. While these parasitic capacitances 106 are usually small (i.e., in the fF range), the voltage on the reader coil can reach high values. The product of a high reader coil voltage and small parasitic capacitances is then a disturbance voltage at the sensor input which, depending on the reader antenna and capacitor geometry, reaches significant values.

A simple estimation of such disturbance voltages is: a reader coil voltage of 50 $V_{peak-peak}$ at a frequency of 13.56 MHz, 100 fF effective parasitic capacitances due to having the device-under-test capacitor electrodes close to the reader coil, and a 1 pF $C_{DUT}$, yields 2.38 $V_{peak-peak}$ at the sensor interface input. Assuming typical CMOS chip supply voltages, this disturbance can significantly alter the measurement result when no counter-measures are taken. In addition to the above-mentioned reader field, other disturbance sources may also exist (e.g. UHF readers, Wi-Fi, and EMI disturbances in production lines).

Therefore, in accordance with the present disclosure, a system for detecting tampering with a product is provided, the system comprising: a capacitor comprised in or attached to the product; an integrated circuit configured to inject a current in said capacitor and to detect a corresponding voltage slope on said capacitor; wherein the integrated circuit is further configured to divide said voltage slope into a plurality of slope segments; wherein the integrated circuit is further configured to discard a first set of slope segments, whose slope value falls outside a predefined range of slope values; wherein the integrated circuit is further configured to use a second set of slope segments, whose slope value falls within said predefined range, for determining a capacitance on the capacitor. In this way, valid capacitance measurement results may be distinguished from invalid capacitance measurement results. Invalid measurement results are those measurement results which are influenced by external factors, such as electromagnetic disturbances, to an unacceptable degree. In other words, the integrated circuit may inject current into the device-under-test capacitor $C_{DUT}$ and measure the resulting voltage slope this approach allows for a low power consumption where the disturbance robustness may be improved by splitting the voltage slope on the capacitor into segments and performing a linearity check on the slope. This allows to determine if the measurement result is valid or if it is invalid due to high disturbances.

In an embodiment, the integrated circuit is further configured to use only those slope segments of the second set that have substantially the same slope value for determining the capacitance on the capacitor. In this way, valid measurement results are properly distinguished from invalid measurement results because valid measurement results are those results that correspond to slope segments whose slope values are substantially the same. It is noted that the term "substantially" refers to the slope segments having the same slope value within predefined error margins or error boundaries. Thus, the slope values do not need to be exactly the same, but a small difference within a certain error margin may still be acceptable. In particular, the allowed deviation or error may depend on the requirements of a given application. For instance, for big capacitive changes, where accuracy is not so important, a relatively large error margin of approximately 10% could be used. When small capacitive changes should be detected, and thus a high accuracy is required, a small error margin of approximately 0.1% could be used.

In a practical and effective implementation, the integrated circuit comprises an array of comparators for detecting the voltage slope on said capacitor. Alternatively, the integrated circuit comprises a comparator with a switchable reference voltage source for detecting the voltage slope on said capacitor. Furthermore, in a practical and effective implementation, the integrated circuit is further configured to compare the capacitance with a reference value to detect said tampering with the product.

In a further embodiment, the integrated circuit comprises a configurable capacitor array switchably coupled to the capacitor, for reducing the input impedance of the capacitor. By coupling a configurable, chip-internal capacitor array to the external capacitor, the input impedance of the external capacitor can be reduced. In this way, disturbances of the capacitance on the external capacitor are actively countered. In particular, as a counter-measure against the disturbances, additional internal capacitances can be switched in parallel to the external $C_{DUT}$ in order to decrease the overall impedance. Independently of the size of $C_{DUT}$ the overall impedance and therefore the disturbance voltage at the sensor input can be kept small.

In a practical and effective implementation, the integrated circuit is configured to connect the configurable capacitor array to the capacitor if the capacitance on said capacitor falls below a predefined threshold. Furthermore, in a practical and effective implementation, the integrated circuit is configured to disconnect the configurable capacitor array from the capacitor if the capacitance on said capacitor exceeds the predefined threshold.

Figure 2A:
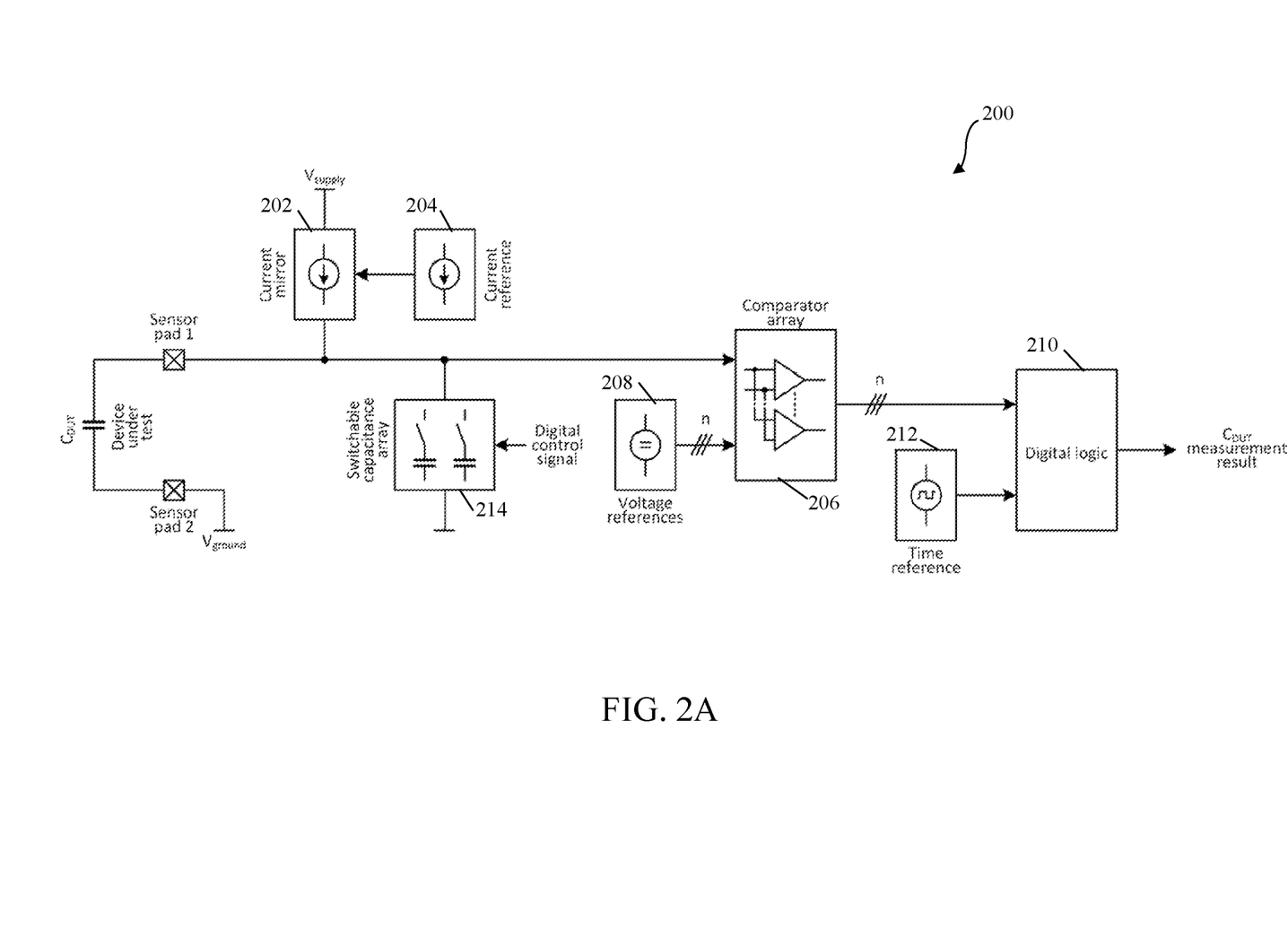
FIG. 2A shows an illustrative embodiment of a system for detecting tampering with a product.

FIG. 2A shows an illustrative embodiment of a system 200 for detecting tampering with a product. The system 200 comprises a current mirror 202, a current reference 204, a comparator array 206, voltage references 208, digital logic 210, a time reference 212, and a switchable capacitance array 214. In operation, a current $I_{meas}$ is injected into the device-under-test capacitor $C_{DUT}$ connected to the chip pins. A voltage difference $\Delta V$ at the capacitor observed in a time interval $\Delta T$ allows to determine the capacitance $C_{DUT}$: $C_{DUT} = I_{meas} \cdot \Delta T / \Delta V$. The device-under-test capacitor is externally connected to two sensor pads. The current mirror 202 injects the current $I_{meas}$ into that capacitor. The array 206 of comparators detects when the voltage at the capacitor is crossing several reference voltages 208. Furthermore, the digital block 210 evaluates the linearity of the voltage slope on the device-under-test capacitor $C_{DUT}$, using the voltage-crossing signals of the comparator array 206 as an input. Alternatively, to save area and power, also a single comparator with a switchable reference voltage source could be used (not shown). In the digital block 210 a counter measures the time difference between subsequent reference voltage crossings to provide a measurement result. In addition, a configurable capacitor array 214 allows for a decreased input impedance.

More specifically, each voltage crossing marks the beginning of a new slope segment. Thus, the division of the voltage slope into slope segments can be implemented in the digital block 210 by monitoring the voltage-crossing signals and restarting the counter upon reception of a new voltage-crossing signal. The slope value of a specific slope segment may be calculated by dividing the difference between the two relevant reference voltages by the elapsed time (i.e., by the counter value): slope value=(Vref(n+1)−Vref(n))/$\Delta t$. This slope value may be compared with a predefined range of slope values, to determine whether it is not too steep or too flat. If the slope value falls within the predefined range, then the slope segment is a valid segment and can thus be used to calculate the capacitance $C_{DUT}$; otherwise it is an invalid segment and it is discarded.

After each reception of a voltage-crossing signal the counter value is stored in memory to be able to perform post-processing for providing the measurement result. It is noted that it is not necessary to restart the counter at each reception of a voltage-crossing signal. That is to say, the counter can be kept running without a reset and then later subtractions can be performed to obtain the $\Delta t$ value for each of the segments. In case that the reference voltages are equidistant (i.e. Vref(n+2)−Vref(n+1)=Vref(n+1)−Vref(n)) then the voltage values do not need to be considered in the calculation, and only the counter values (time values) are required to provide a measurement result.

By verifying if the slope value falls within the predefined range, a first condition for distinguishing valid segments from invalid segments is defined. In addition, a second condition is defined by determining whether the slope values of the slope segments, which satisfy the first condition, have substantially the same value. In this way, as mentioned above, valid measurement results are properly distinguished from invalid measurement results. Thus, the validity does not only depend on the steepness of a single segment being within a predefined range. In addition, the slope segments being within the allowed range (i.e. the slope segments that are reasonably steep) should have substantially the same slope value (i.e. the same slope value within certain error boundaries).

Figure 2B:
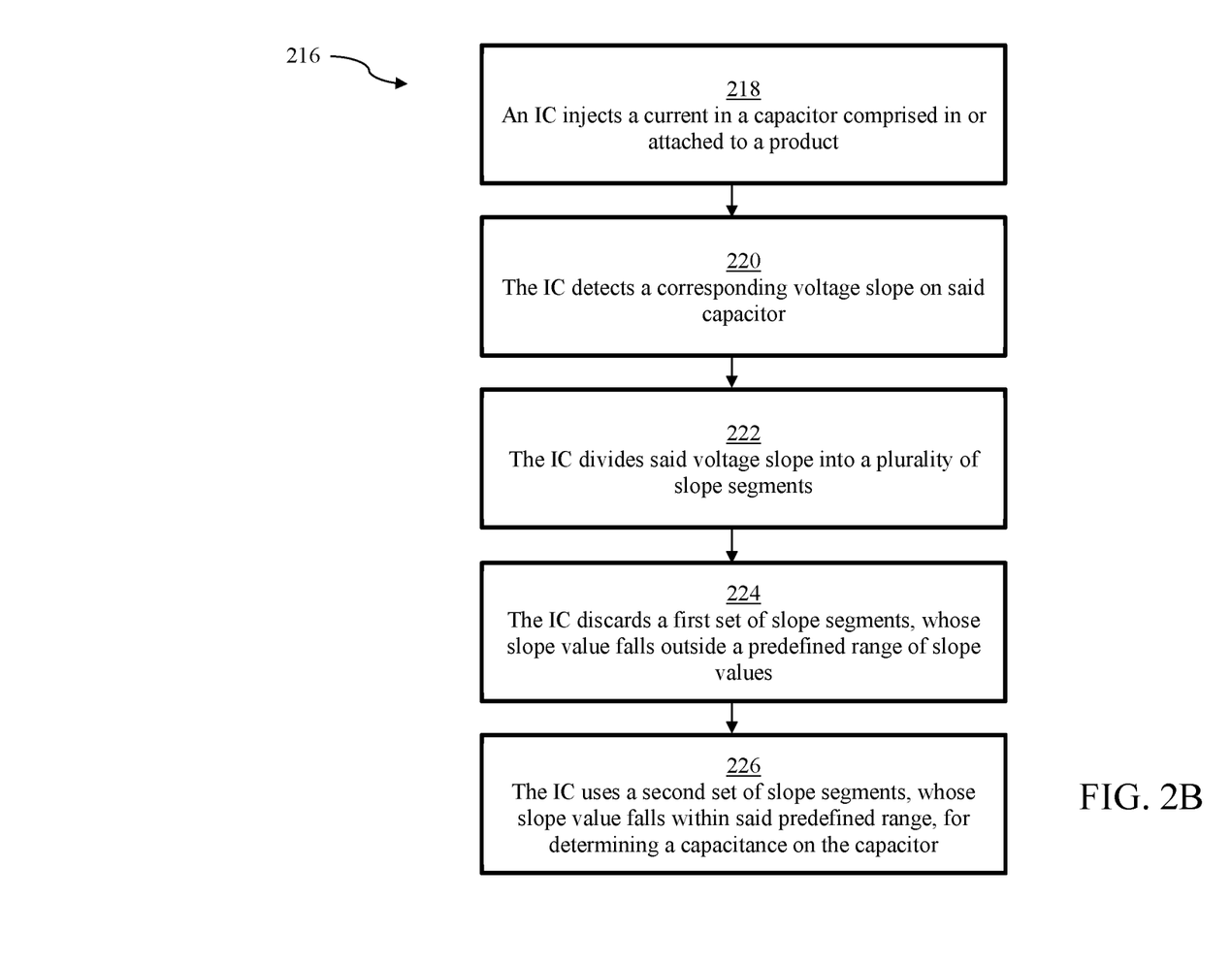
FIG. 2B shows an illustrative embodiment of a method for detecting tampering with a product.

FIG. 2B shows an illustrative embodiment of a method 216 for detecting tampering with a product. The method 216 comprises the following steps. At 218, an integrated circuit (IC) injects a current in a capacitor comprised in or attached to a product. Then, at 220, the IC detects a corresponding voltage slope on said capacitor. Subsequently, at 222, the IC divides said voltage slope into a plurality of slope segments. Then, at 224, the IC discards a first set of slope segments, whose slope value falls outside a predefined range of slope values, and at 226, the IC uses a second set of slope segments, whose slope value falls within said predefined range, for determining a capacitance on the capacitor. More specifically, in an embodiment, the integrated circuit uses only those slope segments of the second set that have substantially the same slope value for determining the capacitance on the capacitor. In this way, valid measurement results are properly distinguished from invalid measurement results.

Figure 3A:
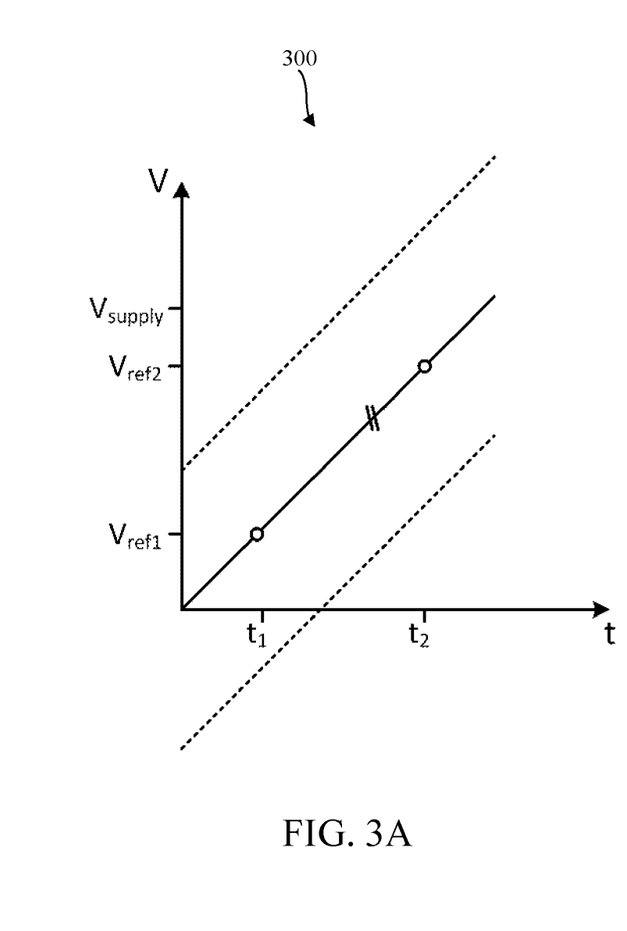
FIG. 3A shows an example of an undisturbed voltage slope.
Figure 3B:
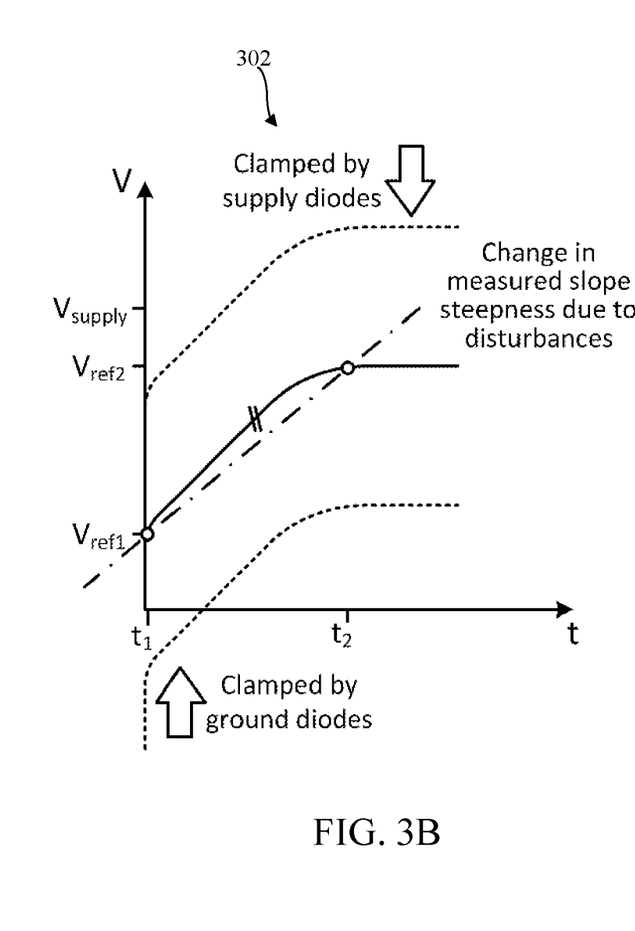
FIG. 3B shows an example of a disturbed voltage slope.

FIGS. 3A and 3B show an example of an undisturbed voltage slope 300 and an example of a disturbed voltage slope 302. Strong alternating current (AC) voltage disturbances in series to the device-under-test due to parasitic capacitive coupling from the reader coil can cause a clamping of the sensor input pins by the diodes to ground and supply (such diodes usually exist in CMOS technology). That clamping can deform the otherwise linear voltage slope at the sensor interface and cause wrong measurement results if no counter-measures are taken. More specifically, FIG. 3B shows the voltage slope on the capacitor $C_{DUT}$ under influence of disturbances. The mean value (solid line) and the upper and lower peak values of the envelope (dashed lines) of the AC signal are shown. In a typical disturbance case 302, the measured slope steepness (dash-dotted line) is different from the undisturbed case 300. However, if only two measurement points are used, then a deformation of the slope cannot be detected.

Figure 4:
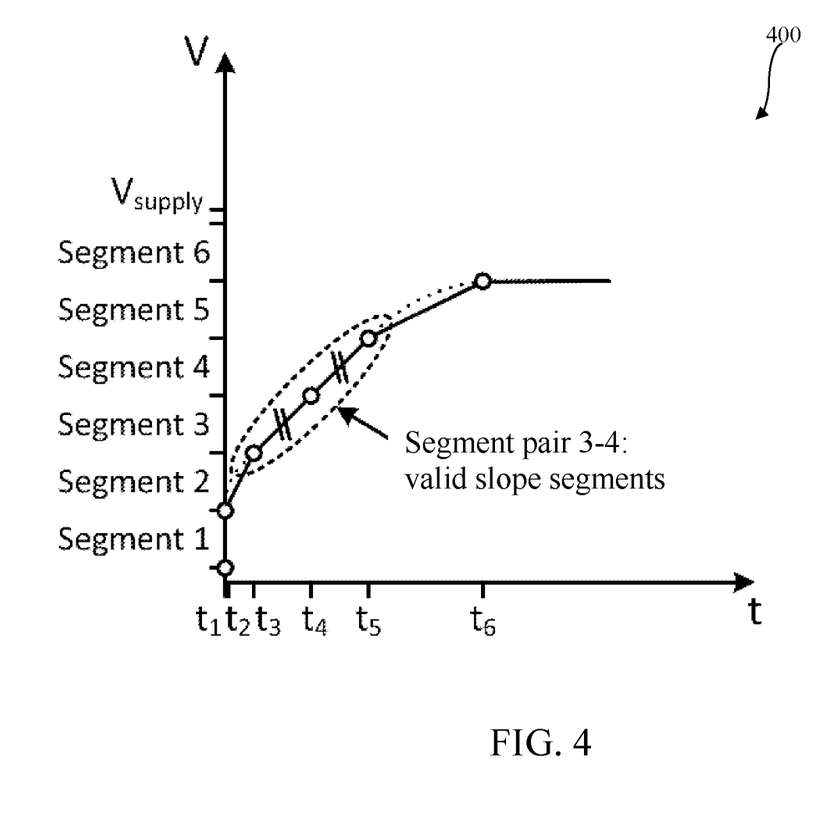
FIG. 4 shows an illustrative embodiment of a voltage slope divided into a plurality of slope segments.

FIG. 4 shows an illustrative embodiment of a voltage slope divided into a plurality of slope segments 400. In particular, FIG. 4 shows a more specific embodiment of distinguishing valid slope segments from invalid slope segments. In accordance with the present disclosure, the voltage slope is divided into a plurality of segments. Slope segments that are too steep (e.g., due to strong clamping at ground diodes) and slope segments that are too flat (e.g., due to strong clamping at supply diodes) are discarded. In the present example, segments 1 and 2 are too steep, and segments 5 and 6 are too flat. Furthermore, slope segments whose slope value falls within a predefined range of slope segments are used for determining the capacitance on the external capacitor. In the present example, this is the case for segments 3 and 4. More specifically, a linearity check should be performed, i.e. it should be checked if there is still at least one segment pair with equal slope available. If this is the case, then these two segments can be used as a valid capacitance measurement result.

As mentioned above, in a further embodiment, the integrated circuit comprises a configurable capacitor array switchably coupled to the capacitor, for reducing the input impedance of the capacitor. More specifically, adding internal capacitances in parallel to the external CDUT decreases the overall impedance at the capacitive sensor input. The lower the input impedance, the lower also the disturbance voltage at the sensor input due to parasitic capacitive coupling from the reader coil (capacitive divider of reader coil voltage). Therefore, by means of such an internal capacitor array the probability of invalid measurements due to high disturbances can be actively reduced.

The following approach can be applied:

1) In case of a small $C_{DUT}$, the disturbance voltage at the sensor interface can be high, which may cause an invalid measurement. Adding additional internal capacitance $C_{int}$ increases the overall capacitance at the sensor interface, thereby decreasing the disturbances. If the measurement is repeated and a valid measurement $C_{meas}$ is achieved, then the device-under-test capacitance $C_{DUT}$ can be obtained by subtracting the known internal capacitance value from the valid measurement result: $C_{DUT}=C_{meas}-C_{int}$.

2) In case of a large $C_{DUT}$ no additional internal capacitors should be added in parallel, as otherwise the measurement might run into a time-out. Anyway, due to the low input impedance the disturbance voltage at the sensor interface is already low, and no additional internal capacitors are needed.

A fine granularity of the capacitor array $C_{int}$ allows to optimize the disturbance voltage reduction in function of the size of $C_{DUT}$ while avoiding time-outs.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 tamper detection system
102 passive RFID tag with sensor interface
104 device-under-test capacitor
106 distributed parasitic capacitance network
108 reader antenna
200 system for detecting tampering with a product
202 current mirror
204 current reference
206 comparator array
208 voltage references
210 digital logic
212 time reference
214 switchable capacitance array
216 method for detecting tampering with a product
218 an IC injects a current in a capacitor comprised in or attached to a product
220 the IC detects a corresponding voltage slope on said capacitor
222 the IC divides said voltage slope into a plurality of slope segments
224 the IC discards a first set of slope segments, whose slope value falls outside a predefined range of slope values
226 the IC uses a second set of slope segments, whose slope value falls within said predefined rage, for determining a capacitance on the capacitor
300 undisturbed voltage slope
302 disturbed voltage slope
400 voltage slope divided into a plurality of slope segments

The invention claimed is:

1. A system for detecting tampering with a product, the system comprising:
a capacitor comprised in or attached to the product;
an integrated circuit configured to inject a current in said capacitor and to detect a corresponding voltage slope on said capacitor;
wherein the integrated circuit is further configured to divide said voltage slope into a plurality of slope segments;
wherein the integrated circuit is further configured to discard a first set of slope segments, whose slope value falls outside a predefined range of slope values;
wherein the integrated circuit is further configured to use a second set of slope segments, whose slope value falls within said predefined range, for determining a capacitance on the capacitor; and
wherein the integrated circuit is further configured to use only those slope segments of the second set that have substantially the same slope value for determining the capacitance on the capacitor.

2. The system of claim 1, wherein the integrated circuit comprises an array of comparators for detecting the voltage slope on said capacitor.

3. The system of claim 1, wherein the integrated circuit comprises a comparator with a switchable reference voltage source for detecting the voltage slope on said capacitor.

4. The system of claim 1, wherein the integrated circuit is further configured to compare the capacitance with a reference value to detect said tampering with the product.

5. The system of claim 1, wherein the integrated circuit is comprised in a radio frequency identification (RFID) tag or in a near field communication (NFC) tag.

6. A system for detecting tampering with a product, the system comprising:
a capacitor comprised in or attached to the product;
an integrated circuit configured to inject a current in said capacitor and to detect a corresponding voltage slope on said capacitor, the integrated circuit comprising a configurable capacitor array switchably coupled to the capacitor, for reducing the input impedance of the capacitor;
wherein the integrated circuit is further configured to divide said voltage slope into a plurality of slope segments;
wherein the integrated circuit is further configured to discard a first set of slope segments, whose slope value falls outside a predefined range of slope values;
wherein the integrated circuit is further configured to use a second set of slope segments, whose slope value falls within said predefined range, for determining a capacitance on the capacitor.

7. The system of claim 6, wherein the integrated circuit is configured to connect the configurable capacitor array to the capacitor if the capacitance on said capacitor falls below a predefined threshold.

8. The system of claim 7, wherein the integrated circuit is configured to disconnect the configurable capacitor array from the capacitor if the capacitance on said capacitor exceeds the predefined threshold.

9. A method for detecting tampering with a product, the method comprising:
an integrated circuit injects a current in a capacitor comprised in or attached to the product;
the integrated circuit detects a corresponding voltage slope on said capacitor;
the integrated circuit divides said voltage slope into a plurality of slope segments;
the integrated circuit discards a first set of slope segments, whose slope value falls outside a predefined range of slope values;
the integrated circuit uses a second set of slope segments, whose slope value falls within said predefined range, for determining a capacitance on the capacitor; and
the integrated circuit uses only those slope segments of the second set that have substantially the same slope value for determining the capacitance on the capacitor.

10. A computer program comprising instructions that, when executed, carry out or control the method of claim 9.

11. A non-transitory computer-readable medium comprising the computer program of claim 10.

12. A method for detecting tampering with a product, the method comprising:
an integrated circuit injects a current in a capacitor comprised in or attached to the product, wherein the integrated circuit comprises a configurable capacitor array switchably coupled to the capacitor, for reducing the input impedance of the capacitor;
the integrated circuit detects a corresponding voltage slope on said capacitor;
the integrated circuit divides said voltage slope into a plurality of slope segments;
the integrated circuit discards a first set of slope segments, whose slope value falls outside a predefined range of slope values;

the integrated circuit uses a second set of slope segments, whose slope value falls within said predefined range, for determining a capacitance on the capacitor.

13. The method of claim 12, wherein the integrated circuit connects the configurable capacitor array to the capacitor if the capacitance on said capacitor falls below a predefined threshold.

* * * * *